(12) United States Patent
Alvarez et al.

(10) Patent No.: US 10,338,274 B2
(45) Date of Patent: Jul. 2, 2019

(54) COMPUTER RADAR BASED PRECIPITATION ESTIMATE ERRORS BASED ON PRECIPITATION GAUGE MEASUREMENTS

(71) Applicant: The Climate Corporation, San Francisco, CA (US)

(72) Inventors: Francisco Alvarez, Seattle, WA (US); Valliappa Lakshmanan, Bellevue, WA (US)

(73) Assignee: The Climate Corporation, San Francisco, CA (US)

( * ) Notice: Subject to any disclaimer, the term of this patent is extended or adjusted under 35 U.S.C. 154(b) by 31 days.

(21) Appl. No.: 15/171,809

(22) Filed: Jun. 2, 2016

(65) Prior Publication Data

US 2017/0351005 A1    Dec. 7, 2017

(51) Int. Cl.
| | |
|---|---|
| *G01W 1/10* | (2006.01) |
| *G01S 13/95* | (2006.01) |
| *G01W 1/14* | (2006.01) |
| *G01W 1/18* | (2006.01) |
| *G01S 7/00* | (2006.01) |

(52) U.S. Cl.
CPC .............. *G01W 1/10* (2013.01); *G01S 7/003* (2013.01); *G01S 13/95* (2013.01); *G01S 13/951* (2013.01); *G01W 1/14* (2013.01); *G01W 1/18* (2013.01); *Y02A 90/18* (2018.01)

(58) Field of Classification Search
CPC ................... G01W 1/10; G01S 13/95
See application file for complete search history.

(56) References Cited

U.S. PATENT DOCUMENTS

| | | | | |
|---|---|---|---|---|
| 5,440,483 | A | * | 8/1995 | Badoche-Jacquet .... G01S 13/95 702/3 |
| 6,879,280 | B1 | * | 4/2005 | Bull .......................... G01S 7/18 342/26 B |

(Continued)

OTHER PUBLICATIONS

Wang, Evaluation of TRMM Ground-Validation Radar-Rain Errors Using Rain Gauge Measurements, Apr. 2009.*

(Continued)

*Primary Examiner* — Mohammad K Islam
(74) *Attorney, Agent, or Firm* — Elliot H. Karlin; Hickman Palermo Becker Bingham LLP

(57) ABSTRACT

In an embodiment, a system receives first data comprising precipitation gauge measurements at a plurality of gauge locations. The system obtains second data comprising radar based precipitation estimates at the plurality of gauge locations. For each radar based precipitation value at the plurality of gauge locations, the system identifies one or more corresponding precipitation gauge measurement, computes a gauge radar differential value for the radar based precipitation estimate, and stores the gauge radar differential value with location data identifying a corresponding location of the plurality of gauge locations. The system then obtains a particular radar based precipitation estimate at a non-gauge location. The system determines that one or more particular gauge radar differential values at one or more particular gauge locations correspond to the particular radar based precipitation estimate at the non-gauge location and computes a particular radar based precipitation estimate error at the non-gauge location.

18 Claims, 11 Drawing Sheets

(56) References Cited

U.S. PATENT DOCUMENTS

| | | | | |
|---|---|---|---|---|
| 8,594,936 | B1* | 11/2013 | Koval | G01W 1/14 702/3 |
| 9,689,984 | B1* | 6/2017 | Breiholz | G01S 13/953 |
| 2009/0160700 | A1* | 6/2009 | Messer-Yaron | G01W 1/02 342/26 R |
| 2009/0175489 | A1* | 7/2009 | Harrington | G01S 7/295 382/100 |
| 2009/0292470 | A1* | 11/2009 | Curry | G01W 1/14 702/3 |

OTHER PUBLICATIONS

Osborn et al., Reciprocal-Distance Estimate of Point Rainfall, 1980.*
Sarah et al., Spatial interpolation techniques for assessing Rainfall Spatial distribution based on rain gauge data, 2008.*
Ware, Corrections to radar-estimated precipitation using observed rain gauge data, Aug. 2005.*
Gourley et al. (Hydrologic Evaluation of Rainfall Estimates from Radar, Satellite, Gauge, and Combinations on Ft. Cobb Basin, Oklahoma (Year: 2011).*
Wang, Evaluation of TRMM Ground-Validation Radar-Rain Errors Using Rain Gauge Measurements (Year: 2009).*
Osborn et al., Reciprocal-Distance Estimate of Point Rainfall (Year: 1980).*
Sarah et al., Spatial interpolation techniques for assessing Rainfall Spatial distribution based on rain gauge data (Year: 2008).*
Ware, Corrections to radar-estimated precipitation using observed rain gauge data (Year: 2005).*
The International Bureau of WIPO, "International Preliminary Report on Patentability", In application No. PCT/US2017/033941, dated Dec. 4, 2018, 13.
Current Claims in application No. PCT/US2017/033941, dated Dec. 2018, 10 pages.
Villarini, Gabriele, "Sensitivity Studies of the Models of Radar-Rainfall Uncertainties", Journal of Applied Meteorology and Climatology, dated 2010, vol. 49, 22 pages.
Roebber, Paul, "Visualizing Multiple Measures of Forecast Quality", dated Apr. 2009, American Meteorological Society, 8 pages.
Marshall et al., "The Distribution of Raindrops with Size", dated Aug. 1948, vol. 5, 2 pages.
Anagnostou et al., "Uncertainty Quantification of Mean-Areal Radar-Rainfall Estimates", Journal of Atmospheric and Oceanic Technology, dated 1999 vol. 16, 10 pages.

* cited by examiner

Fig. 2
(a)
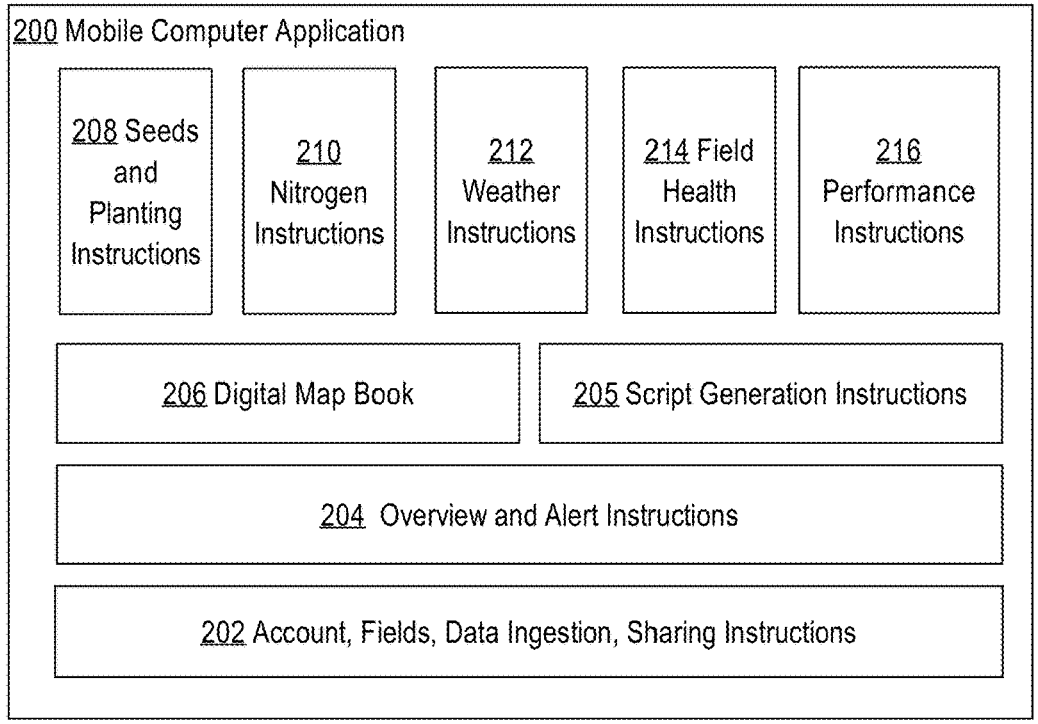
(b)
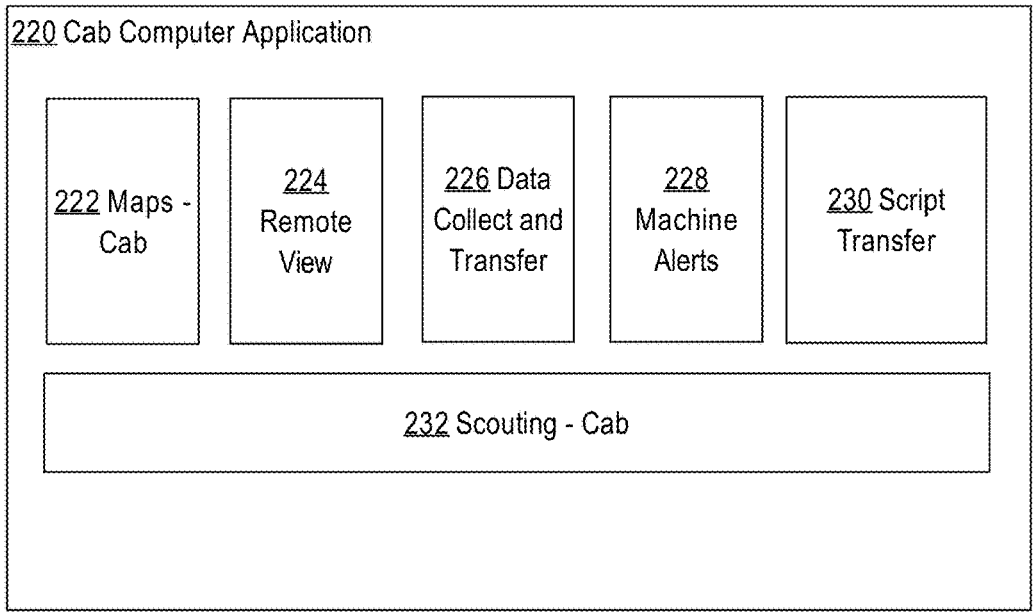

FIG. 6

| | | | | | | | |
|---|---|---|---|---|---|---|---|
| | CROP | PLANTED ACRES | PRODUCT | RELATIVE MATURITY | TARGET YIELD | POPULATION(AVG) | PLA |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

Data Manager

Nitrogen | Planting | Practices | Soil

Planting 1(4 Fields)
Crop Corn Product
Plant Date: 2016-04-12
ILU 112 \| Pop: 34000
[Edit] [Apply]

Planting 2(0 Fields)
Crop Corn Product
Plant Date: 2016-04-15
ILU 83 \| Pop: 34000
[Edit] [Apply]

Planting 3(0 Fields)
Crop Corn Product
Plant Date: 2016-04-13
ILU 83 \| Pop: 34000
[Edit] [Apply]

Planting 4(1 Fields)
Crop Corn Product
Plant Date: 2016-04-13
ILU 112 \| Pop: 34000
[Edit] [Apply]

+ Add New Planting Plan

COMPUTER RADAR BASED PRECIPITATION ESTIMATE ERRORS BASED ON PRECIPITATION GAUGE MEASUREMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to computer systems useful in climatology and agricultural. The disclosure relates more specifically to computer systems that are programmed or configured to generate radar based precipitation estimate errors through inverse distance weighting of gauge radar differential values.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Water, often received via rain or other precipitation, is an essential element to life. For farmers, rainfall is a large factor in determining how much water a crop receives, thereby altering the potential yield for the crop. While rainfall has many positive effects, such as giving life to crops, large quantities of rainfall can also have severe repercussions, such as by causing floods or resulting in standing or ponding water that can inundate seedlings or mature crops. Thus, accurate measurements of rainfall can be extremely important, both to maximize gains from the rainfall and minimize risks from an overabundance of rainfall.

Rainfall is generally measured using one of two approaches. One approach for measuring rainfall involves utilizing physically placed rain gauges. The rain gauges are set at a variety of locations and are used to gather precipitation and measure the amount of precipitation received at the rain gauge over a period of time. While rain gauges create accurate measurements of the amount of precipitation received at the rain gauge, rain gauge data is only available where a rain gauge has been physically placed. Precipitation amounts in non-gauge locations may be inferred from the measurements at surrounding gauge locations, but the inferred precipitation amounts do not contain the same levels of accuracy as the gauge measurements.

A second approach to measuring rainfall involves utilizing radar data to calculate the rainfall. Generally, a polarized beam of energy is emitted from a radar device in a particular direction. The beam travels un-disturbed before encountering a volume of air containing hydrometeors, such as rainfall, snowfall, or hail, which causes the beam to scatter energy back to a radar receiver. Based on the amount of time it takes for a radar beam to return, the distance between the radar device and the volume of air containing hydrometeors is computed. The amount of energy that is received by the radar, also known as the reflectivity, is used to compute the rainfall rate. Often, the relationship between the reflectivity and the actual rainfall rate is modeled through the Z-R transformation:

$$Z = aR^b$$

where Z is the reflectivity and R is the actual rainfall rate. The parameters for the Z-R transformation may be identified through measurements for rain gauges for a particular area and/or type of storm.

A drawback with using radar reflectivity to measure the rainfall rate is that the radar reflectivity at best creates an estimate of the actual rainfall. While radar reflectivity is generally understood to be directly related to the rainfall rate, a wide variety of atmospheric conditions are capable of leading to the same reflectivity, yet producing different rainfall rates. The differences in drop sizes specifically can lead to variations in the rainfall rate while producing the same reflectivity. For example, a small number of large drop sizes will produce the same reflectivity data as a large number of smaller rainfall drops, but a large number of smaller drop sizes will generally produce more precipitation on the ground than a small number of large drop sizes. Often, these inaccuracies are similar across nearby locations due to similarities in storm sizes and distances between the location of the precipitation and the radar devices.

Many hydrologists attempt to solve the inaccuracies in measurements of rainfall rates with radar devices by employing calibration techniques to ensure that the radar measurements that are received are as accurate as possible. The persistent problem is that the actual error in the rainfall rates is not measured or computed. Even if estimates of rainfall rates can be produced with higher accuracy through calibration techniques, it is still important to be able to determine and present the full range of possible precipitation values. For example, if it is known that a river will flood if it receives over an inch of rain, then an estimate of 0.9 inches of rain may lead hydrologists to the false conclusion that the river will not flood. On the other hand, a probabilistic estimate that includes the possible range of precipitation values with corresponding likelihoods would allow a hydrologist to determine the probability that the river will flood.

Additionally, the amount of rainfall a crop has received is extremely important in modeling the growth of a crop. The amount of water a field receives not only affects the availability of water to the crop, but the availability of other elements, such as nitrogen and potassium, to the crop. As a crop's growth can be widely dependent on the availability of water and other chemicals, variances in the amount of rainfall received by a field can lead to variances in a model of the growth of a crop. If these variances are not understood and presented to a farmer, the farmer may not be able to make informed decisions with respect to the crop.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
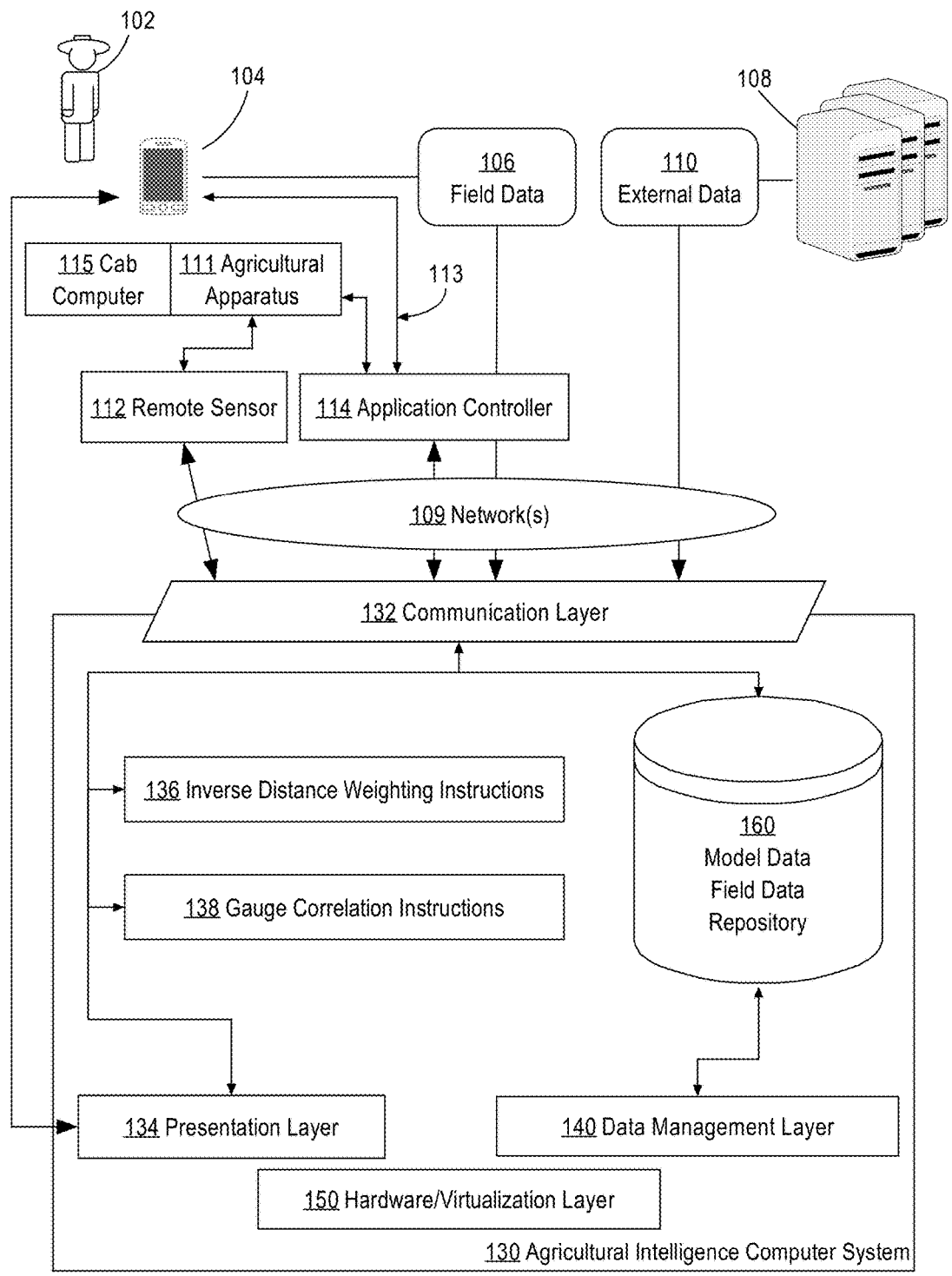
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
  2.1. STRUCTURAL OVERVIEW
  2.2. APPLICATION PROGRAM OVERVIEW
  2.3. DATA INGEST TO THE COMPUTER SYSTEM
  2.4. PROCESS OVERVIEW—AGRONOMIC MODEL TRAINING
  2.5. IMPLEMENTATION EXAMPLE—HARDWARE OVERVIEW
3. INVERSE DISTANCE WEIGHTING
  3.1. GAUGE RADAR DIFFERENTIALS
  3.2. GAUGE CORRELATION
    3.2.1. TRUNCATED CORRELATION
    3.2.2. LIMITED TRUNCATED CORRELATION
    3.2.3. RELATIVE CORRELATION
  3.3. SIMILARITY DISTANCES
  3.4. ERROR COMPUTATION
  3.5. DATA DISPLAY
  3.6. AGRONOMIC MODELS
4. BENEFITS OF CERTAIN EMBODIMENTS
5. EXTENSIONS AND ALTERNATIVES

1. General Overview

Aspects of the disclosure generally relate to computer-implemented techniques for computing precipitation estimate errors through inverse distance weighting of gauge radar differential values. In an embodiment, an agricultural intelligence computer system receives a plurality of radar based precipitation estimates and a plurality of gauge measurements of precipitation. The agricultural intelligence computer system computes a gauge radar differential value for each location associated with a gauge measurement. When the agricultural intelligence computer system receives a radar based precipitation estimate at a location without a gauge measurement, the computer system computes a radar based precipitation estimate at the location without a gauge measurement based on one or more gauge radar differential values at one or more locations with a gauge measurement.

In an embodiment, a method comprises receiving over a network at a digital computing system, first electronic digital data comprising a first plurality of values representing precipitation gauge measurements at a plurality of gauge locations; obtaining second electronic digital data comprising a second plurality of values representing radar based precipitation estimates at the plurality of gauge locations; for each radar based precipitation estimate value at the plurality of gauge locations: identifying one or more corresponding precipitation gauge measurement values of the first plurality of values representing precipitation gauge measurements; computing a gauge radar differential value for the radar based precipitation estimate based, at least in part, on one or more corresponding precipitation gauge measurement values of the first plurality of values representing precipitation gauge measurements and the radar based precipitation estimate value; storing the gauge radar differential value with location data identifying a corresponding location of the plurality of gauge locations; and obtaining a particular radar based precipitation estimate at a non-gauge location; determining that one or more particular gauge radar differential values at one or more particular gauge locations of the plurality of gauge locations correspond to the particular radar based precipitation estimate at the non-gauge location; computing a particular radar based precipitation estimate error at the non-gauge location based, at least in part, on the one or more particular gauge radar differential values at the one or more particular gauge locations and one or more distances between the non-gauge location and the one or more particular gauge locations; causing displaying, on a client computing device, the particular radar based precipitation estimate and the particular radar based precipitation estimate error at the non-gauge location.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
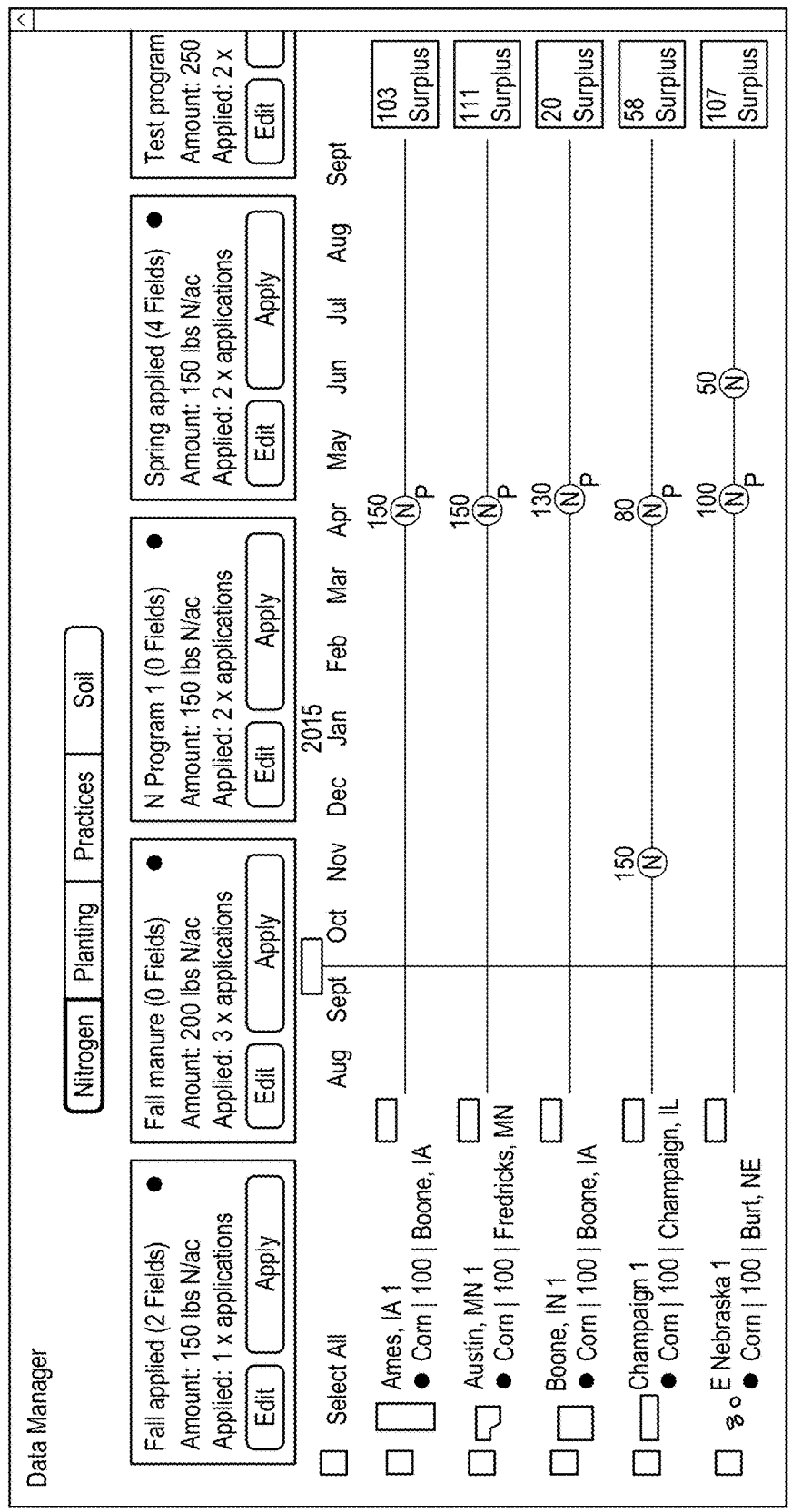
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Inverse distance weighting instructions 136 comprise computer readable instructions which, when executed by one or more processors, cause agricultural intelligence computer system 130 to perform computation of radar based precipitation estimate errors based on gauge measurement values at one or more gauge locations and radar based precipitation estimates at the one or more gauge locations. Gauge correlation instructions 138 comprise computer readable instructions which, when executed by one or more processors, cause agricultural intelligence computer system 130 to perform identification and correlation of one or more gauge locations to a particular non-gauge location.

Each of inverse distance weighting instructions 136 and gauge correlation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the nutrient modeling instructions 135 may comprise a set of pages in RAM that contain instructions which when executed cause performing the nutrient modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of inverse distance weighting instructions 136 and gauge correlation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
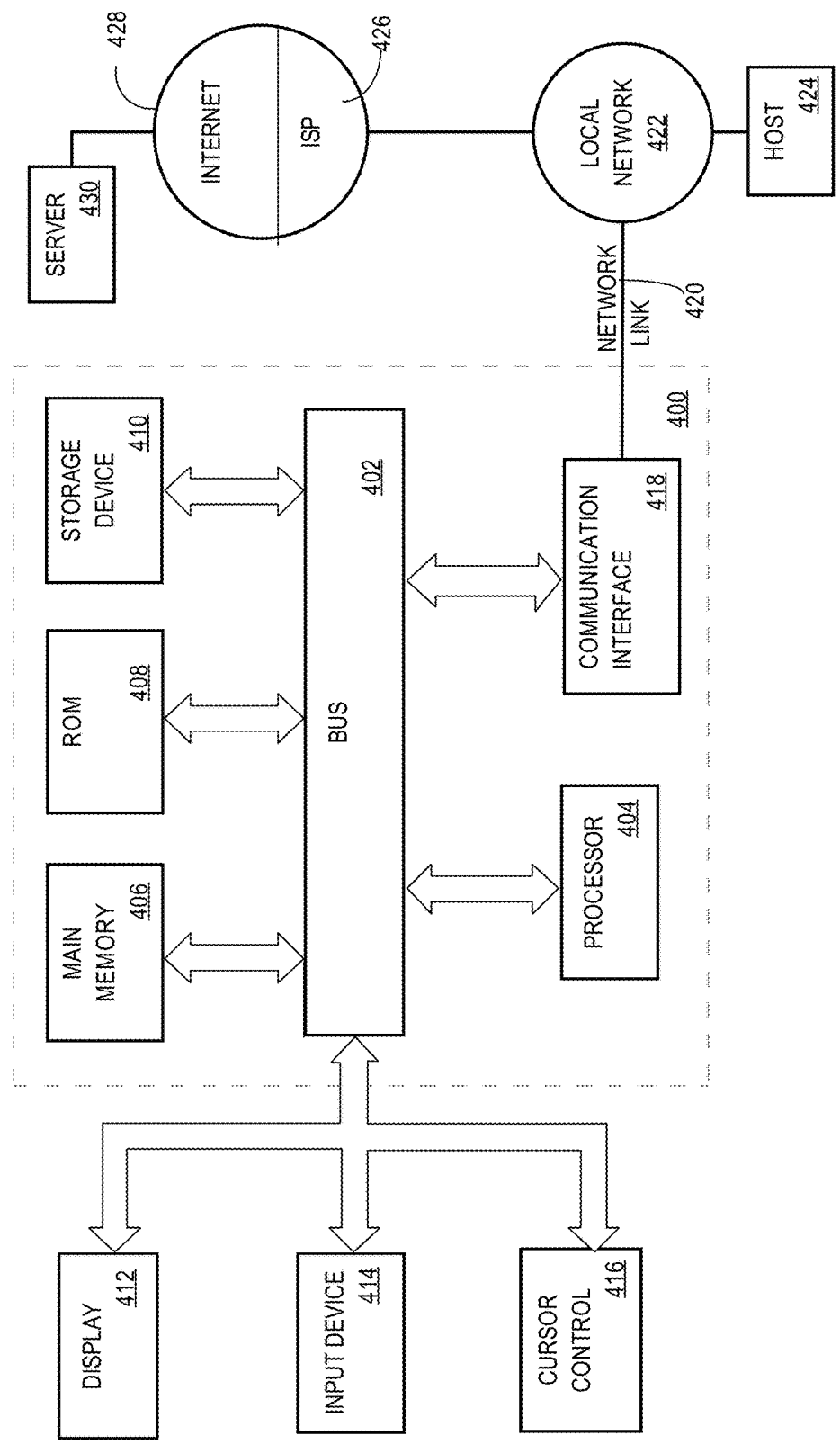
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yieldlimiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
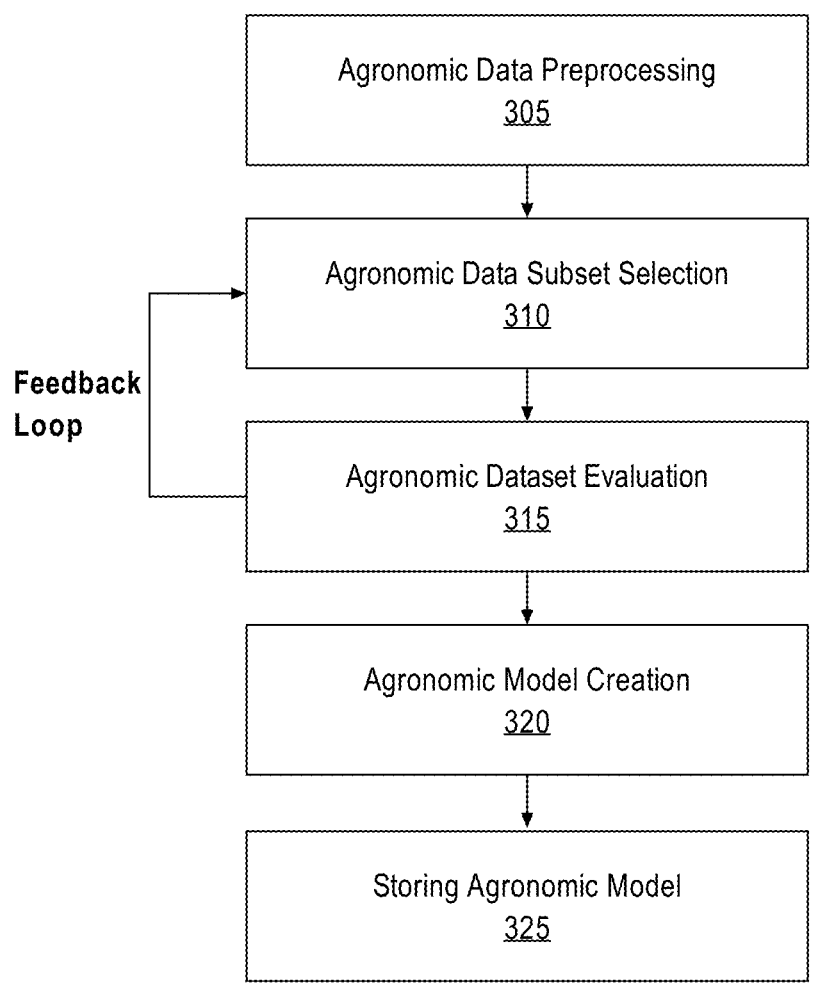
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Inverse Distance Weighting

Figure 7:
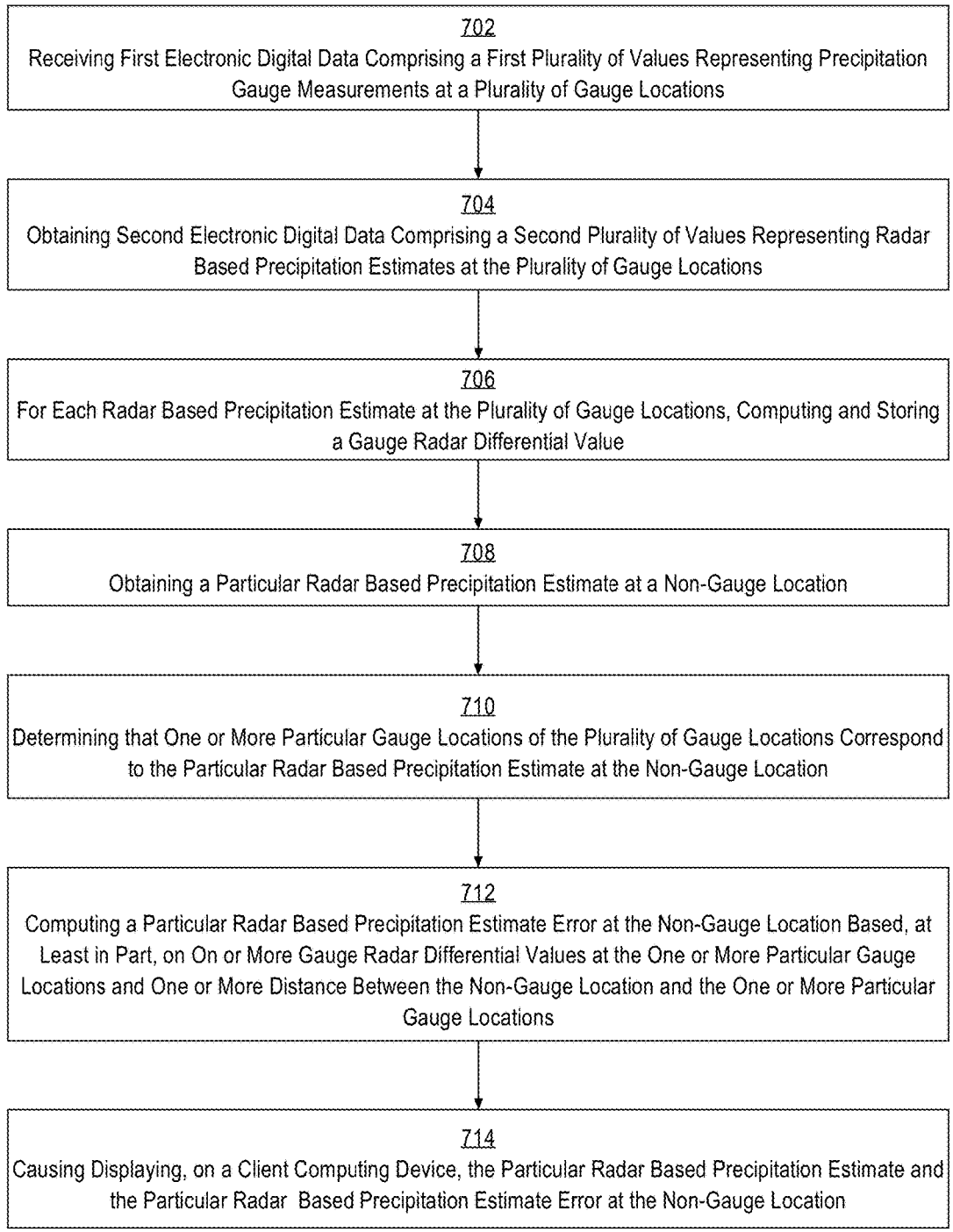
FIG. 7 is a flow diagram that depicts a method of computing a radar based precipitation estimate error at a non-gauge location based on gauge radar differential values corresponding to gauge locations.

FIG. 7 is a flow diagram that depicts a method of computing a radar based precipitation estimate error at a non-gauge location based on gauge radar differential values corresponding to gauge locations.

3.1. Gauge Radar Differentials

At step 702, first electronic digital data comprising a first plurality of values representing precipitation gauge measurements at a plurality of gauge locations is received. For example, agricultural intelligence computer system 130 may send a request to the external data server computer 108 for a plurality of gauge measurements at the one or more gauge locations. External data server computer 108 may comprise one or more gauge server computers configured to transmit measurements of precipitation intensity as measured by one or more precipitation gauges. A gauge location, as used herein, refers to a physical location which contains a rain gauge for measuring precipitation.

The one or more gauge server computers may be communicatively coupled to one or more precipitation gauges at the one or more gauge locations. In the present context, a gauge location is location in which gauge measurements are received. For example, the Meteorological Assimilation Data Ingest System (MADIS) network maintains provides rain gauge data for a plurality of locations. Each location from which MADIS receives measurements of precipitation may comprise a gauge location. Agricultural intelligence computer system 130 may send a request to the one or more gauge server computers for measurements of precipitation. In an embodiment, agricultural intelligence computer system 130 is programmed or configured to interact with multiple different computer servers to receive gauge measurements. For example, agricultural intelligence computer system 130 may receive gauge measurements from multiple different sources, thereby increasing the number of gauges which agricultural intelligence computer system 130 may use to identify errors in the radar measurements. Each gauge measurement source may comprise a single server computer or multiple server computers. For example, each computing device may be communicatively coupled to a gauge location operated by a single source. The computing devices attached to the gauges may transmit the gauge measurements directly to agricultural intelligence computer system 130 or to a centralized server computer which transmits aggregated gauge data to agricultural intelligence computer system 130.

At step 704, second electronic digital data comprising a second plurality of values representing radar based precipitation estimates at the plurality of gauge locations is obtained. Agricultural intelligence computer system 130 may obtain the radar based precipitation estimates by initially receiving radar precipitation estimates from external data server computer 108. Additionally and/or alternatively, agricultural intelligence computer system 130 may initially receive radar reflectivity measurements from the external data server computer 108 and compute the radar based precipitation estimates from the radar reflectivity measurements. In an embodiment, external data server computer 108 comprises a plurality of server computers owned or operated by different entities. For example, agricultural intelligence computer system 130 may be communicatively coupled to one or more radar server computers and one or more gauge server computers.

The one or more radar server computers may be communicatively coupled to a radar device which emits a polarized signal towards the one or more gauge locations and receives scattered energy. In some embodiments, agricultural intelligence computer system 130 receives reflectivity data, comprising a location of the radar device, an amount of energy emitted from the radar device, a direction of the energy emission, an amount of time between the emission and the receipt of the scattered energy, and an amount of scattered energy received. From the reflectivity data, agricultural intelligence computer system 130 may compute the location of the precipitation and the magnitude of the precipitation.

In other embodiments, one or more initial computations may be performed in advance, such as by the one or more radar server computers, and agricultural intelligence computer system 130 may receive location and/or precipitation magnitude estimates from the one or more radar server computers. For example, agricultural intelligence computer system 130 may send a digital request or message to the one or more radar server computers to retrieve radar measurements or precipitation estimates for a particular location, such as a gauge location. The request or message may specify the locations of interest by latitude-longitude values or other identification values.

In response, the one or more radar computer servers may compute the location of precipitation for each reflectivity measurement and may identify energy measurements that are associated with the particular location. The one or more radar computer servers may send the reflectivity measurements associated with the particular location to agricultural intelligence computer system 130 in one or more response messages. Additionally and/or alternatively, the one or more radar computer servers may compute one or more estimates for the amount of precipitation at the particular location and send the computed estimates to agricultural intelligence computer system 130.

Agricultural intelligence computer system 130 may be programmed or configured to receive radar data from multiple different sources. Agricultural intelligence computer system 130 may use the radar data received from different sources to strengthen the computation of precipitation intensities and the determination of the errors in the precipitation intensities. For example, agricultural intelligence computer system 130 may receive radar reflectivity measurements from multiple different radar devices at different locations. Agricultural intelligence computer system 130 may use the multiple measurements to correct for errors in the radar reflectivity measurements caused by outside sources, such as noise, atmospheric conditions, or physical barriers between radar devices and gauge locations. Additionally and/or alternatively, agricultural intelligence computer system 130 may model errors for precipitation estimates for each different radar device.

In an embodiment, agricultural intelligence computer system 130 parameterizes the Z-R transformation in order to compute the radar based precipitation estimates. Parameterizing the Z-R transformation may comprise identifying values for a and b in the Z-R transformation, $Z=aR^b$ that minimizes the difference between observed gauge measurements and estimations of the precipitation intensity calculated through the Z-R transformation. Agricultural intelligence computer system 130 may create a single parameterization of the Z-R transformation or create parameterizations of the Z-R transformation for particular periods of time, particular locations, particular types of precipitation, or any combination. For example, agricultural intelligence computer system 130 may parameterize the Z-R transformation for each twenty four hour period based on gauge measurements and reflectivity data received over the past twenty four hours.

Additionally and/or alternatively, agricultural intelligence computer system 130 may parameterize the Z-R transformation separately for various locations. For example, agricultural intelligence computer system 130 may select a region that has been identified as encompassing a particular weather pattern and parameterize the Z-R transformation using gauge measurements and reflectivity data from gauges in the region identified as encompassing the particular weather pattern. Agricultural intelligence computer system 130 may also use combinations of temporal and geographical constraints in parameterizing the Z-R transformation. For example, agricultural intelligence computer system 130 may identify a particular weather pattern that encompasses a particular region during a particular period of time. Agricultural intelligence computer system 130 may parameterize the Z-R transformation using gauge measurements and reflectivity data from gauges in the particular region during the particular period of time.

Agricultural intelligence computer system 130 may also parameterize the Z-R transformation using other empirical data about the particular precipitation event. Agricultural intelligence computer system 130 may execute digitally programmed instructions to identify values for the parameters based on the other empirical data. For example, agricultural intelligence computer system 130 may receive disdrometer data identifying an average size of the drops of water in a particular storm. Based on the average drop size identified by the disdrometer, agricultural intelligence computer system 130 may select a stored set of parameters that corresponds to the particular drop size. Additional factors for identifying parameters in the Z-R transformation may include the drop size distribution and drop arrival rate.

At step 706, for each radar based precipitation estimate at the plurality of gauge locations, a gauge radar differential value is computed and stored. As the rain gauges measure precipitation directly, a difference between the gauge measurement value and the radar based precipitation estimate indicates an error in the radar based precipitation estimate at the particular location. Agricultural intelligence computer system 130 may compute one or more gauge radar differential values for each location in order to identify errors in the radar based precipitation estimates at the locations.

Figure 8:
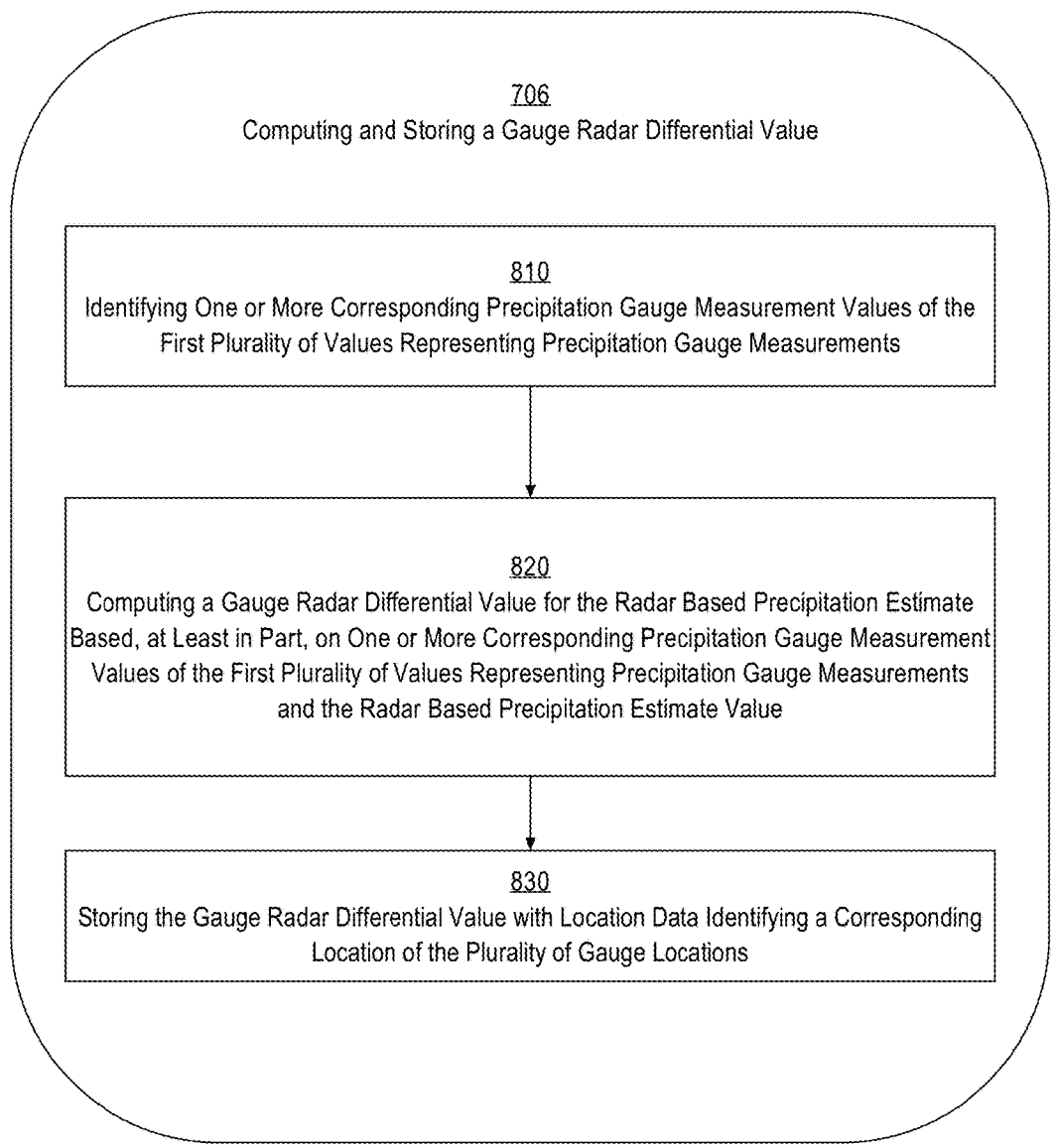
FIG. 8 is a flow diagram that depicts a method of computing a gauge radar differential value for each gauge location.

FIG. 8 is a flow diagram that depicts a method of computing a gauge radar differential value for each gauge location. At step 810, one or more corresponding precipitation gauge measurement values of the first plurality of values representing precipitation gauge measurements is identified. For example, for each gauge location, agricultural intelligence computer system 130 may identify one or more radar based precipitation estimates that represent precipitation estimates at the gauge location.

In an embodiment, a plurality of radar based precipitation estimate values may correspond to a single rain gauge and/or a plurality of rain gauges may correspond to a single radar based precipitation estimate value. For example radar based precipitation estimate values may be received at a different resolution than the precipitation gauge measurements. Thus, if one precipitation gauge measurement corresponds to a region of twenty square kilometers while precipitation rate estimates correspond to region of five square kilometers each, multiple precipitation rate estimates may correspond to the single gauge measurement value. Conversely, if one precipitation rate estimate value corresponds to a region of twenty square kilometers while precipitation gauge measurements correspond to regions of five kilometers each, multiple precipitation gauge measurements may correspond to a single radar based precipitation rate estimate.

At step 820, a gauge radar differential value for the radar based precipitation estimate is computed based, at least in part, on one or more corresponding precipitation gauge measurement values of the first plurality of values representing precipitation gauge measurements and the radar based precipitation estimate value. The gauge radar differential value, as used herein, refers to a computed error of the radar based precipitation estimate value based on a corresponding gauge measurement being treated as a true value. The gauge radar differential value may be a computed difference between the gauge measurement value and the radar based precipitation estimate value. For example, if the gauge measurement value is 5.2 mm/hr and the radar based precipitation estimate value is 5.0 mm/hr, the gauge radar differential value may be +0.2 mm/hr. Additionally and/or alternatively, the gauge radar differential value may be a percentage difference between the gauge measurement value and the radar based precipitation estimate value. For example, in the example above, a percentage gauge radar differential value may be +4% as 0.2 mm/hr is 4% of 5.0 mm/hr.

At step 830, the gauge radar differential value is stored with location data identifying a corresponding location of the plurality of gauge locations. For example, agricultural intelligence computer system 130 may store data which indicates, for each radar gauge differential value, a location to be associated with the radar gauge differential value, such as coordinates in latitude and longitude. In an embodiment, the corresponding location comprises a location associated with the gauge measurement value and/or a location associated with a radar based precipitation estimate. For example, if the location associated with the gauge measurement value has a different resolution than the location of the radar based precipitation estimate, agricultural intelligence computer system 130 may select the location with the finer resolution as the corresponding location.

3.2. Gauge Correlation

Referring to FIG. 7, at step 708, a particular radar based precipitation at a non-gauge location is obtained. For example, agricultural intelligence computer system 130 may send a request to external data server computer 108 for precipitation estimates for one or more particular locations. Additionally and/or alternatively, agricultural intelligence computer system 130 may send a request to external data server computer 108 for radar reflectivity data for one or more particular locations and may compute the particular radar based precipitation estimate from the radar reflectivity data.

At step 710, one or more particular gauge radar differential values at one or more particular gauge locations of the plurality of gauge locations are determined to correspond to the particular radar based precipitation estimate at the non-gauge location. For example, agricultural intelligence computer system 130 may be configured to compute a radar based precipitation estimate error at a non-gauge location based on the gauge radar differential values at one or more gauge locations.

In an embodiment, agricultural intelligence computer system 130 uses a global approach to computing the radar based precipitation estimate error at the non-gauge location. For example, agricultural intelligence computer system 130 may identify one or more gauge radar differential values for each gauge location to correspond to the particular radar based precipitation estimate at the non-gauge location. While each gauge radar differential value may be given a different weight in the computation of the radar based precipitation estimate error at the non-gauge location, gauge radar differential values at each location are still used in the computation under the global approach.

In an embodiment, in order to remove dependencies on gauge radar differential values from far away sources, agricultural intelligence computer system 130 uses a maximum gauge number approach to computing the radar based precipitation estimate error at the non-gauge location. Agricultural intelligence computer system 130 may store a maximum gauge number threshold value. Agricultural intelligence computer system 130 may select a number of gauge radar differential values that is less than or equal to the maximum gauge number threshold value to correspond to the particular radar based precipitation estimate at the non-gauge location.

In an embodiment, agricultural intelligence computer system 130 selects the gauge radar differential values based on location values associated with each gauge radar differential value. Agricultural intelligence computer system 130 may compute a plurality of distance values representing distances between the non-gauge location and each location associated with a gauge radar differential value and select the gauge radar differential values associated with the lowest distance values. For example, agricultural intelligence computer system 130 may be configured to correlate each radar based precipitation estimate to the closest five locations with gauge radar differential values. By selecting a maximum number of closest gauge radar differential values, agricultural intelligence computer system 130 improves the computation of radar based precipitation estimate errors by focusing on the gauge radar differential values that are more likely to correspond to the radar based precipitation estimate at the non-gauge location.

3.2.1. Truncated Correlation

In an embodiment, agricultural intelligence computer system 130 improves the computation of the radar based precipitation estimate error using a truncated correlation approach. The truncated correlation approach reduces the effects of gauge radar differential values at locations that are far from the non-gauge location. Agricultural intelligence computer system 130 may store a maximum distance threshold value indicating a maximum distance within which a radar based precipitation value may be determined to correlate to a gauge radar differential value. Agricultural intelligence computer system 130 may use the maximum distance threshold value in order to identify gauge locations that correspond to a particular non-gauge location.

Figure 9B:
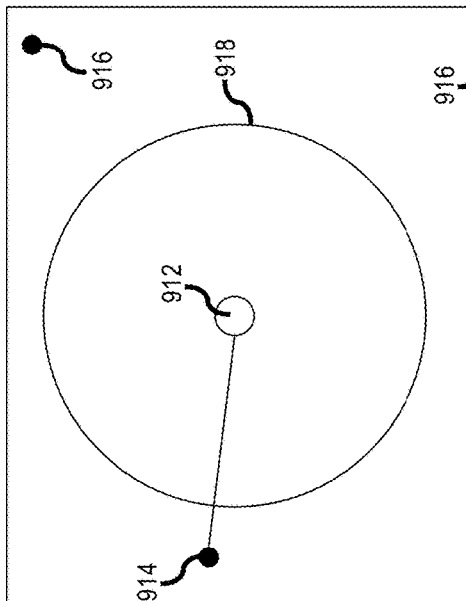
FIG. 9B depicts a method of identifying gauge locations that correspond to a non-gauge location using a truncated correlation approach when no gauge locations are within a maximum distance threshold of the non-gauge location.
Figure 9A:
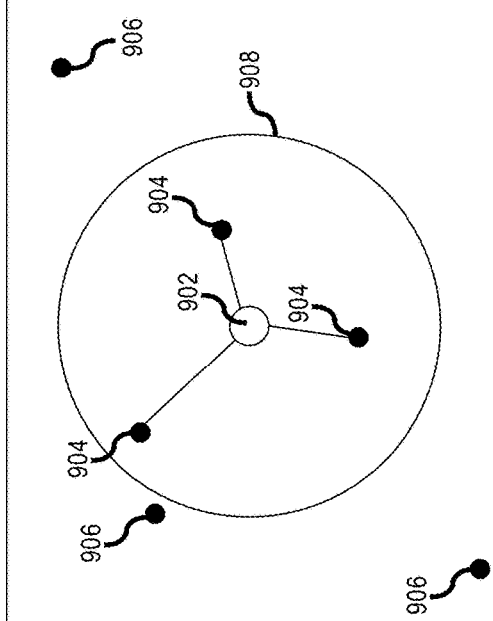
FIG. 9A depicts a method of identifying gauge locations that correspond to a non-gauge location using a truncated correlation approach.

FIG. 9A depicts a method of identifying gauge locations that correspond to a non-gauge location using a truncated correlation approach. FIG. 9A includes non-gauge location 902, gauge locations 904 and 906, and maximum distance threshold 908. Each of non-gauge location 902 and gauge locations 904 and 906 in FIG. 9A represent physical locations, each of which corresponding to at least a radar based precipitation estimate. Using the truncated correlation approach, all of the gauge locations 904 are identified to correspond to the non-gauge location because they are within maximum distance threshold 908. As gauge locations 906 are outside maximum distance threshold 908, agricultural intelligence computer system 130 does not correlate gauge locations 906 to non-gauge location 902. The truncated correlation approach ensures that only nearby gauge radar differential values are used to compute a precipitation estimate error at a particular non-gauge location.

Agricultural intelligence computer system 130 may use digitally programmed logic to compute a radar based precipitation estimate error at a non-gauge location using the truncated correlation approach even when no gauge locations are within the maximum distance from the non-gauge location. FIG. 9B depicts a method of identifying gauge locations that correspond to a non-gauge location using a truncated correlation approach when no gauge locations are within a maximum distance threshold of the non-gauge location. FIG. 9B includes non-gauge location 912, gauge locations 914, 916, and maximum distance threshold 918. Each of non-gauge location 912 and gauge locations 914, 916 in FIG. 9B represent physical locations, each of which corresponding to at least a radar based precipitation estimate.

In FIG. 9B, none of gauge locations 914, 916 are within maximum distance threshold 918 from non-gauge location 912. In the embodiment depicted in FIG. 9B, agricultural intelligence computer system determines that no gauge locations are within the maximum distance threshold 918 from the non-gauge location 912 and, in response to determining, selects gauge location 914, the gauge location with the shortest distance to the non-gauge location, to correspond to non-gauge location 912. In other embodiments, agricultural intelligence computer system 130 may, instead of selecting the closest gauge location, increase the maximum distance threshold 918 in order to encompass more values.

3.2.2. Limited Truncated Correlation

In an embodiment, agricultural intelligence computer system 130 improves the computation of the radar based precipitation estimate error using a limited truncated correlation approach. The limited truncated correlation approach reduces the effects of a large number of nearby gauge locations. Agricultural intelligence computer system 130 may store a maximum gauge number threshold value indicating a maximum number of gauge locations to correlate to the non-gauge location. Agricultural intelligence computer system 130 may use the maximum gauge number threshold value in order to identify gauge locations that correspond to a particular non-gauge location.

Figure 9D:
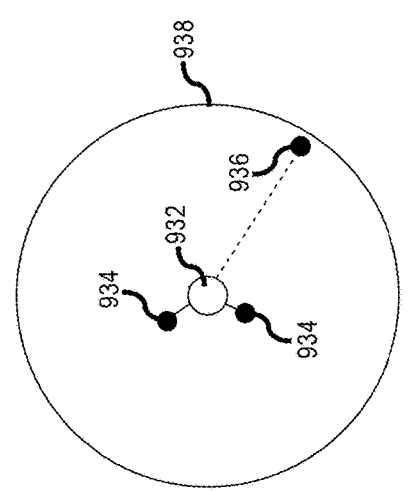
FIG. 9D depicts a method of identifying gauge locations that correspond to a non-gauge location using a relative distance threshold and a maximum distance threshold.
Figure 9C:
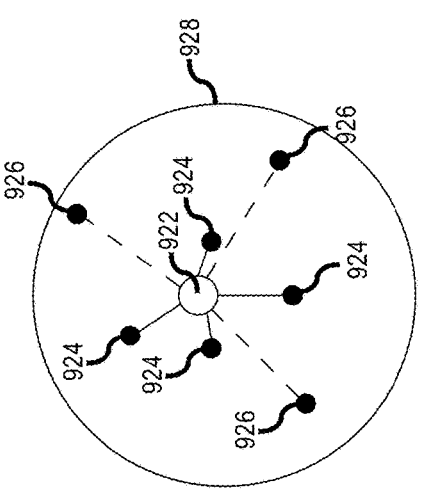
FIG. 9C depicts a method of identifying gauge locations that correspond to a non-gauge location using a limited truncated correlation approach.

FIG. 9C depicts a method of identifying gauge locations that correspond to a non-gauge location using a limited truncated correlation approach. FIG. 9C includes non-gauge location 922, gauge locations 924, 926, and maximum distance threshold 928. The non-gauge location 922 and gauge locations 924, 926 in FIG. 9C represent physical locations, each of which corresponds to at least a radar based precipitation estimate.

In FIG. 9C, each of gauge locations 924, 926 are within the maximum distance threshold 928 from non-gauge location 922. In the embodiment in FIG. 9C, in order to reduce counter effects of a large number of gauge locations, agricultural intelligence computer system 130 selects a subset of the gauge locations within the maximum distance threshold to correlate to the non-gauge location. Specifically, agricultural intelligence computer system 130 may select the closest gauge locations to the non-gauge location until a number of gauge locations less than or equal to the maximum gauge number threshold value is selected. For example, in FIG. 9C a maximum gauge number threshold value has been set to four. Thus, only the closest four gauge locations 924 have been selected to correlate to non-gauge location 922 while gauge locations 926 are not correlated to non-gauge location 922 even though they are within the maximum distance threshold 928 of non-gauge location 922.

3.2.3. Relative Correlation

In an embodiment, agricultural intelligence computer 130 improves the computation of the radar based precipitation estimate error using a relative correlation approach. The relative correlation approach reduces the effects of rain gauges that are less likely to be relevant to the computation of the radar based precipitation estimate error by adapting the method of selecting gauges to particular situations. Under the relative correlation approach, distances of the closest rain gauges are used to identify gauge locations that correspond to a particular non-gauge location.

Agricultural intelligence computer system 130 may be programmed or configured to compute a relative distance threshold based on locations of one or more of the closest gauge locations. In an embodiment, the computation of the relative distance threshold comprises computing a product of a particular multiple with the distance between the non-gauge location and a closest gauge location. For example, agricultural intelligence computer system 130 may store a particular multiple value to be used for computing the relative distance. Thus, if the particular multiple value is three and the distance to the closest gauge location is five kilometers, agricultural intelligence computer system 130 may identify only gauge locations within fifteen kilometers to correspond to the non-gauge location. Additionally and/or alternatively, agricultural intelligence computer system 130 may identify a particular number of the closest gauge locations and use the distance to the furthest of the identified gauge locations from the non-gauge location. For example, if three gauge locations are at distances of two kilometers, three kilometers, and five kilometers respectively and a particular multiple value is two, agricultural intelligence computer system may identify only gauge locations within ten kilometers to correspond to the non-gauge location.

In an embodiment, agricultural intelligence computer system 130 may be programmed or configured to compute a relative distance threshold based on differences in distances of a plurality of the closest gauge locations. For example, agricultural intelligence computer system 130 may compute distances between the non-gauge location and each of the gauge locations. Agricultural intelligence computer system 130 may select the two closest gauge locations and compute a difference between the distance values of the gauge locations. Agricultural intelligence computer system 130 may use the difference value and a distance value of the farther of the two closest gauge locations to compute the relative distance threshold. For example, the relative distance threshold may be computed as double the difference between the distances of the two closest locations plus the distance of the farther of the two closest locations. Thus, if the closest locations are at distances of 5 kilometers (km) and 8 km from the non-gauge location, agricultural intelligence computer system 130 may compute the relative distance threshold as 14 km, or twice the difference in distances plus the farther distance of 8 km. By computing a relative distance threshold, agricultural intelligence computer system 130 may focus on locations with similar effects on the radar based precipitation estimate error.

In an embodiment, agricultural intelligence computer system 130 uses both a relative distance threshold and a maximum distance threshold in computing the radar based precipitation estimate error at a non-gauge location. FIG. 9D depicts a method of identifying gauge locations that correspond to a non-gauge location using a relative distance threshold and a maximum distance threshold. FIG. 9D includes non-gauge location 932, gauge locations 934, 936, and maximum distance threshold 938. The non-gauge location 932 and gauge locations 934, 936 in FIG. 9D represent physical locations, each of which corresponds to at least a radar based precipitation estimate.

In FIG. 9D, each of gauge locations 934, 936 are within the maximum distance threshold 938 from non-gauge location 932. In the embodiment in FIG. 9D, in order to reduce counter effects of farther away gauge locations that are within the maximum distance threshold 938, agricultural intelligence computer system 130 selects a subset of the gauge locations within the maximum distance threshold to correlate to the non-gauge location. Specifically, agricultural intelligence computer system 130 selects the two closest gauge locations to the non-gauge location and computes a relative distance threshold based on differences in the two distances. As the difference in distance between the two closest gauge locations is relatively small in FIG. 9D, the relative distance threshold may also be relatively small. Thus, gauge location 936 is not correlated to non-gauge location 932 even though it is within the maximum distance threshold 938 of non-gauge location 932.

3.3. Similarity Distance

In an embodiment, agricultural intelligence computer system 130 computes the radar based precipitation estimate error for a non-gauge location based on similarity distances to one or more gauge locations. As used herein, a similarity distance refers to a computed distance based on one or more differences between the radar based precipitation estimate at the non-gauge location and a radar based precipitation estimate at each gauge location. In an embodiment, the similarity distances include physical distances between gauge locations and non-gauge locations. For example, distances may be computed based on latitude and longitude of each location. In alternative embodiments, the similarity distances may include only values other than physical distance. For example, similarity distances may be computed based on only precipitation rate estimates and temperature.

Similarity distances may be computed based on any combination of physical distance, precipitation rate estimates, elevation, temperature, and distance to radar measurement. The distance to radar measurement represents a distance from the location of the estimated precipitation to the radar device used to take the measurement of radar reflectivity data. Errors in radar based precipitation estimates can increase with very short distances to radar devices because the storm is overhead and thus more difficult to sample. Additionally, errors in radar based precipitation estimates can increase with long distances to radar devices due to interference from closer storms.

Figure 10:
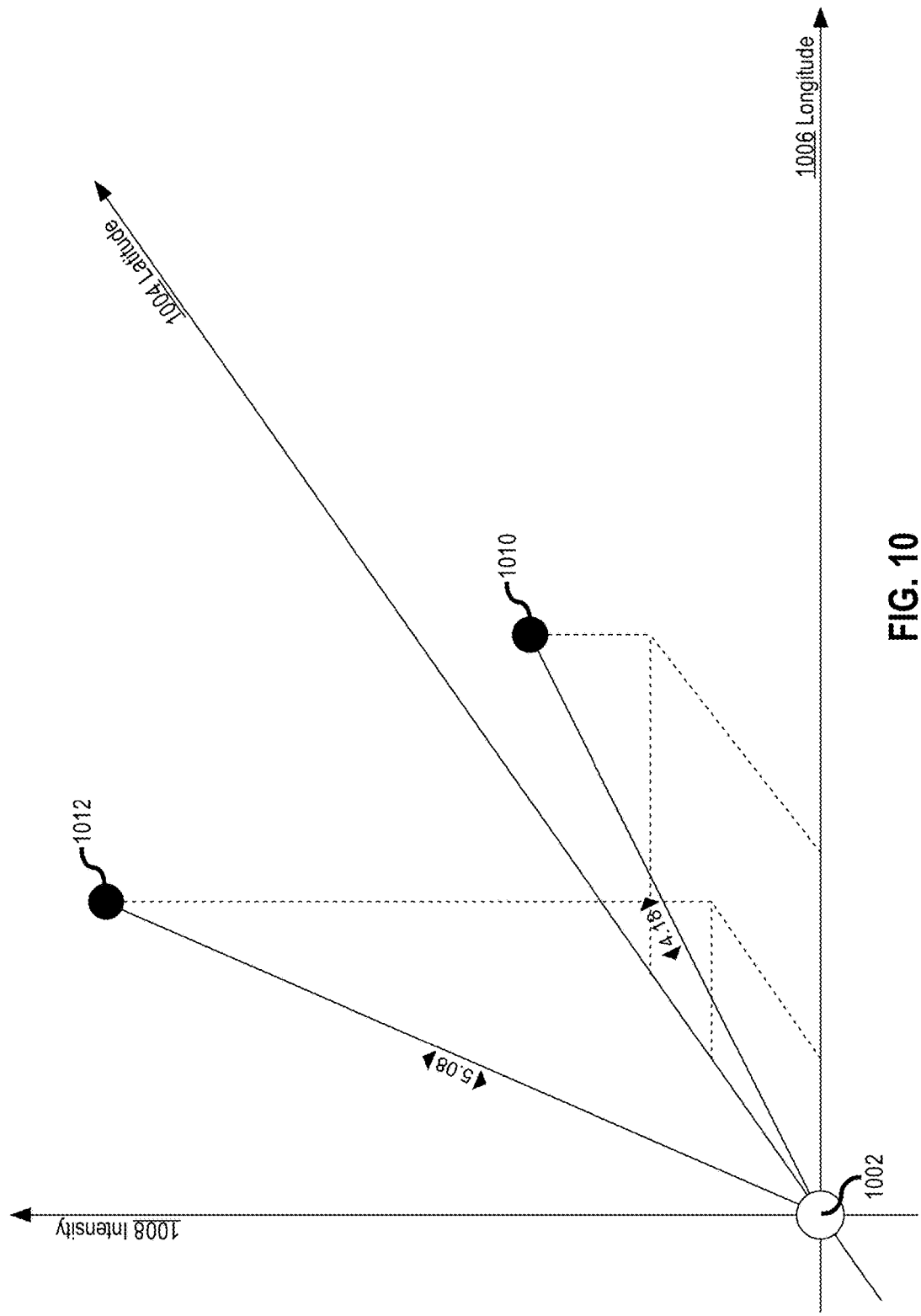
FIG. 10 depicts a method of computing similarity distances between a non-gauge location and two gauge locations using physical distance and intensity.

FIG. 10 depicts a method of computing similarity distances between a non-gauge location and two gauge locations using physical distance and intensity. FIG. 10 includes a three-dimensional graph comprising axes for latitude 1004, longitude 1006, and precipitation intensity 1008. The graph of FIG. 10 further comprises mappings for non-gauge location 1002 and gauge locations 1010 and 1012. In the example in FIG. 10, gauge location 1012 is physically closer to non-gauge location 1002 than gauge location 1010 based on latitude and longitude, but gauge 1010 has a shorter similarity distance due to similarities in precipitation intensity between gauge location 1010 and non-gauge location 1002. While FIG. 10 includes a three dimensional mapping of gauge and non-gauge locations, embodiments may include similarity distances computed in any number of dimensions. Additionally, while physical distance is depicted in FIG. 10 as two dimensions including a latitudinal dimension and a longitudinal dimension, agricultural intelligence computer system 130 may precompute the physical distance between locations and use the physical distances as a single dimension when computing similarity distance.

Computation of a similarity distance may comprise a weighted sum of each of the values used. For example, agricultural intelligence computer system 130 may estimate, for each value, a correlation between the value and similarities in precipitation estimate errors. For example, agricultural intelligence computer system 130 may determine that a strong correlation exists between distance from radar measurement device and gauge radar differential values. Thus, the multiplicative term for the distance to radar measurement device may be higher than the multiplicative term for temperature in order to give the distance to radar measurement device a higher weight. In the present example, a non-gauge location may be more likely to be correlated to a gauge location with a similar distance to the radar measurement device than to a gauge location with a similar temperature.

The similarity distance may be used as the distance value in any of the above methods of identifying gauge locations to correlate to a radar based precipitation estimate value at a non-gauge location. For example, the maximum gauge number approach may comprise selecting the closest gauge locations based on correlation instead of based on only physical distance. Thus, the closest five gauge locations for the maximum gauge number approach may not consist of the physically closest gauge locations, but may instead include gauge locations with more similar precipitation estimate values or distances to radar devices.

3.4. Error Computation

Referring to FIG. 7, at step 712, a particular radar based precipitation estimate error at the non-gauge location is computed based, at least in part, on one or more gauge radar differential values at the one or more particular gauge locations and one or more distances between the non-gauge location and the one or more particular gauge locations. For example, agricultural intelligence computer system 130 may interpolate the particular radar based precipitation estimate error to a particular location based on the gauge radar differential values at the correlated locations and one or more weights for each gauge radar differential values. Agricultural intelligence computer system 130 may interpolate the gauge radar differential values using the following equation:

$$R = \frac{\sum_{i=1}^{n} w_i \epsilon_i}{\sum_{i=1}^{n} w_i}$$

where R is the interpolated error, $\epsilon_i$ is the gauge radar differential value, and $w_i$ is the weight for the gauge radar differential value.

In an embodiment, the weights for each gauge radar differential value are computed as an inverse distance weighting. For example, agricultural intelligence computer system 130 may compute $w_i$ as:

$$w_i = \frac{1}{d_i^b}$$

where $d_i$ is the distance between the gauge location and the non-gauge location and b is a weighting term selected by agricultural intelligence computer system 130. While the above example identifies weight as a function of distance, the weight may also be computed as a function of the similarity distance. Embodiments of the present disclosure may include correlating locations using similarity distances and computing the weights based on physical distance, correlating locations using physical distance and computing the weights based on similarity distance, correlating locations and computing the weights using physical distance, and correlating locations and computing the weights using similarity distance. By using one type of metric to identify correlated locations and a second type of metric to determine weights for the interpolation of the precipitation rate estimate error, agricultural intelligence computer system 130 may identify a weighting term that better describes the relationships between the correlated gauge radar differential values.

In an embodiment, agricultural intelligence computer system 130 computes the weighting term by minimizing differences between radar based precipitation estimate errors at each gauge location and a gauge radar differential value at the gauge location. For each particular gauge location, agricultural intelligence computer system 130 may identify one or more other gauge locations to be correlated to the particular gauge location. Using only the gauge radar differential values at the one or more other gauge locations, agricultural intelligence computer system 130 may compute an interpolated radar based precipitation estimate error at the particular location as a function of the weighting term, b. Agricultural intelligence computer system 130 may then compute a value for b that minimizes the differences between gauge radar differential values at each gauge location and corresponding interpolated radar based precipitation estimate errors the gauge location.

In an embodiment, agricultural intelligence computer system 130 computes a plurality of radar based precipitation estimate error values for each gauge location using different values for the weighting term. Agricultural intelligence computer system 130 may then identify, for each gauge location, values of the weighting term that minimize the difference between the computed radar based precipitation estimate error values and the gauge radar differential values. Agricultural intelligence computer system 130 may then identify an overall weighting term that minimizes the differences between radar based precipitation estimate error values and gauge radar differential values at all locations. Additionally and/or alternatively, agricultural intelligence computer system 130 may identify weighting term values for each location and interpolate the weighting term values to other locations. Thus, the weighting term for computing a radar based precipitation estimate error may have a dependence on location.

In an embodiment, agricultural intelligence computer system 130 computes the weights for each term in the similarity distance by minimizing differences between radar based precipitation estimate errors at each gauge location and a gauge radar differential value at the gauge location. For example, agricultural intelligence computer system 130 may select a value for b using the methods described above. Alternatively, agricultural intelligence computer system 130 may perform the following method using a plurality of values for b. Agricultural intelligence computer system 130 may then normalize each parameter in the similarity distance so that the range of values for each parameter is equivalent. Then, for a particular parameter, agricultural intelligence computer system 130 may set the weights of every other parameter to be equal and compute a weight for the particular parameter that minimizes the differences between radar based precipitation estimate errors and gauge radar differential values at each of the gauge locations.

3.5. Data Display

Referring to FIG. 7, at step 714, the particular radar based precipitation estimate error and the particular radar based precipitation estimate error at the non-gauge location is displayed on a client computing device. Displaying the particular radar based precipitation estimate and radar based precipitation estimate error may comprise displaying a range of probable precipitations with an indication of the estimated value. Agricultural intelligence computer system 130 may display the particular radar based precipitation estimate and radar based precipitation estimate error through presentation layer 134 on field manager computing device 104.

Figure 11:
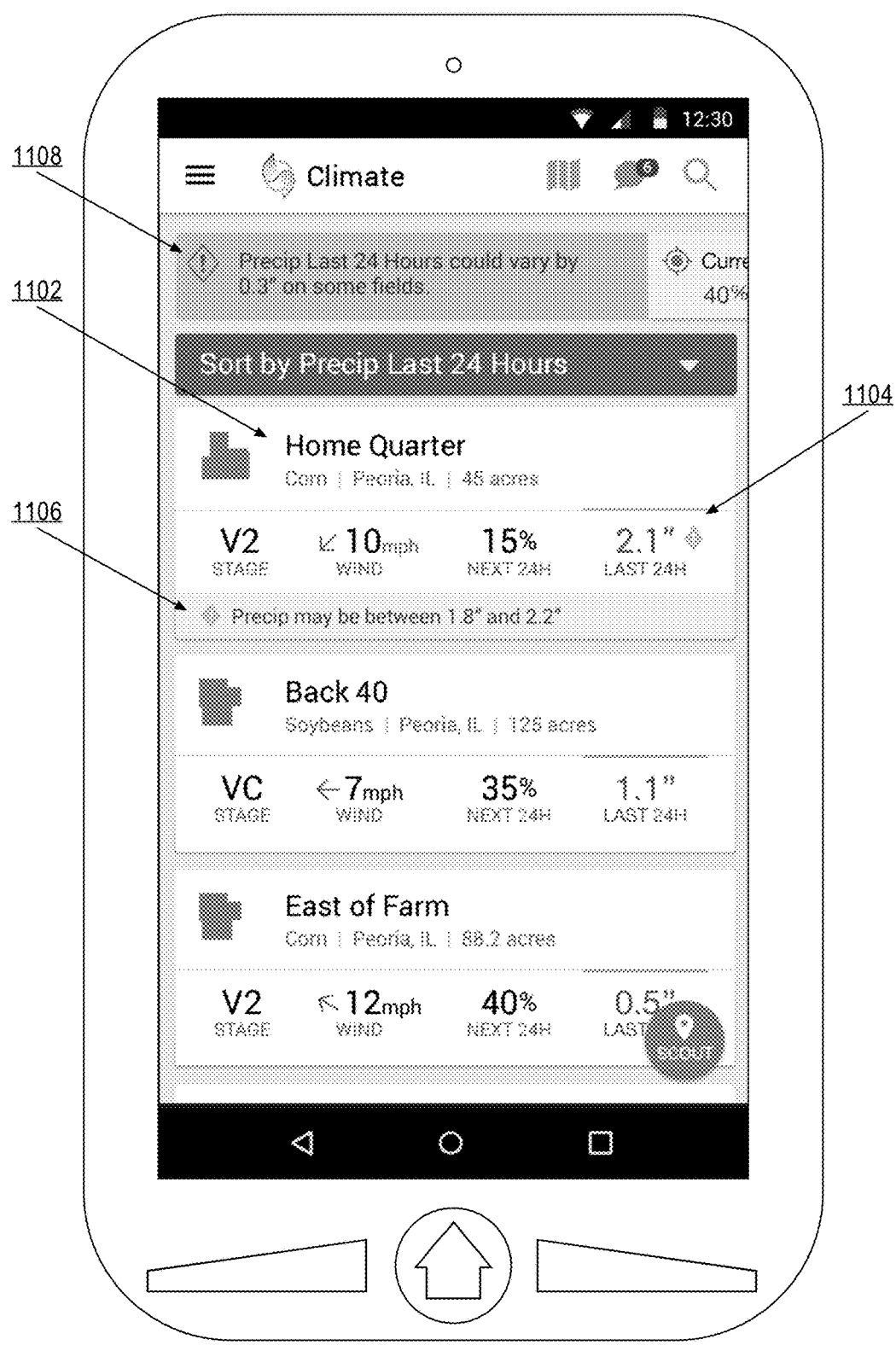
FIG. 11 depicts a graphical user interface displaying precipitation estimates with possible errors for one or more fields on a client computing device.

FIG. 11 depicts a graphical user interface displaying precipitation estimates with possible errors for one or more fields on a client computing device. Field manager computing device 104 contains a graphical user interface with field identification 1102, precipitation estimate 1104, precipitation uncertainty 1106, and uncertainty warning 1108. Field identification 1102 identifies one or more fields associated with user 102 of field manager computing device 104. For example, user 102 may be a farmer that wishes to track an amount of water received by one or more crops on one or more fields. The farmer may identify the one or more fields to agricultural intelligence computer system 130 and agricultural intelligence computer system 130 may send precipitation estimates at the one or more fields to the farmer.

Precipitation estimate 1104 identifies the estimated precipitation value for a particular period of time. Precipitation estimate 1104 may correspond to a precipitation estimate received by agricultural intelligence computer system 130 or computed by agricultural intelligence computer system 130 from radar reflectivity data relating to the one or more fields. Precipitation uncertainty 1106 depicts the radar based precipitation estimate error. For example, in FIG. 11, the precipitation estimate is 2.1" and the estimate error includes a range from 1.8" to 2.2". Uncertainty warning 1108 identifies a variance of precipitation for one or more of the fields. By indicating a variance that applies to one or more of the fields, agricultural intelligence computer system 130 notifies user 102 that the precipitation estimates may not be completely accurate, thereby allowing user 102 to make more informed decisions regarding management of the crops on the one or more fields.

3.6. Agronomic Models

In an embodiment, agricultural intelligence computer system 130 uses precipitation estimates and uncertainties in the precipitation estimates to create an agronomic model. In an embodiment, an agronomic model is a data structure in memory of agricultural intelligence computer system 130 that contains location and crop information for one or more fields. An agronomic model may also contain agronomic factors which describe conditions which may affect the growth of one or more crops on a field. Additionally, an agronomic model may contain recommendations based on agronomic factors such as crop recommendations, watering recommendations, planting recommendations, and harvesting recommendations. The agronomic factors may also be used to estimate one or more crop related results, such as agronomic yield. The agronomic yield of a crop is an estimate of quantity of the crop that is produced.

In an embodiment, agricultural intelligence computer system 130 uses the precipitation estimates to create an agronomic model in memory or in persistent storage in response to a request from field manager computing device 104 for an agronomic model. In other embodiments, agricultural intelligence computer system 130 receives a request from a third party for an agronomic model. For example, an insurance company may request an agronomic model for an insured customer's field to determine the risks associated with the crop planted by the customer. In another example, an application server may send a request to agricultural intelligence computer system 130 to create an agronomic model for a specific user's field. Alternatively, agricultural intelligence computer system 130 may generate agronomic models periodically for particular supervised fields. Agricultural intelligence computer system 130 may also generate agronomic models in response to obtaining updated precipitation estimates.

Agricultural intelligence computer system 130 may create an agronomic model which identifies one or more effects of received precipitation on the crops of a field. The amount of water a crop receives may affect the development cycle of the crop. Agricultural intelligence computer system 130 may estimate the amount of water a crop needs and determine the likely amount of water the crop will receive from natural precipitation based on the precipitation estimates. Agricultural intelligence computer system 130 may use this information to affect the estimate for agronomic yield. Additionally, agricultural intelligence computer system 130 may use the precipitation estimates to generate recommendations for farmers. For example, agricultural intelligence computer system 130 may recommend that a crop is not watered on a day that has a high probability of large amounts of precipitation. Alternatively, agricultural intelligence computer system 130 may recommend that a crop receives extra water for periods of time when precipitation has been estimated to be low.

In an embodiment, uncertainties in the estimates are propagated into the agronomic models. For example, agricultural intelligence computer system 130 may determine that a particular crop requires 2.1" of precipitation on a particular day before the crop is adversely affected by the lack of water. If agricultural intelligence computer system 130 obtains an estimate of 2.2" of precipitation on the particular day, agricultural intelligence computer system 130 may identify the probability that the actual precipitation is lower than 2.1" and create a probability that the crop is adversely affected by the lack of water based on the probability that the actual precipitation is lower than 2.1". In an embodiment, agricultural intelligence computer system 130 identifies overall effects on agronomic values based on uncertainties in the precipitation. For example, agricultural intelligence computer system 130 may identify a different agronomic yield for a crop when the crop receives less than 2.1" of precipitation. Thus, using the techniques described herein, agricultural intelligence computer system 130 may generate a probabilistic distribution of the agronomic yield of the crop based, at least in part, on uncertainties in the precipitation received by the crop.

Uncertainties in the estimates of precipitation estimates may also be propagated into other models that have a dependence on water content in the one or more fields. For example, the moisture content of a field may affect a crop's ability to access one or more agrochemicals, such as nitrogen, in the field. Additionally, the moisture content of a field may affect the loss of agrochemicals through processes such as leaching. Thus, while the precipitation estimates may be used to model the effects of precipitation on the other models, agricultural intelligence computer system 130 may also model the effects on the other models of different levels of precipitation that are consistent with the estimated uncertainties. For example, if precipitation above a particular level would increase the loss of nitrogen by ten percent, agricultural intelligence computer system 130 may identify the probability that the actual precipitation intensity is above the particular level as a probability of an increase in the loss of nitrogen by ten percent.

4. Benefits of Certain Embodiments

Using the techniques described herein, a computer can deliver radar based precipitation estimate error data that would be otherwise unavailable. For example, the techniques herein can determine, for a particular radar based precipitation estimate, a range of precipitation values that encompasses the actual amount of precipitation received by one or more fields. The performance of the agricultural intelligence computing system is improved using the truncated correlation techniques described herein which reduces the number of computations necessary to compute a radar based precipitation rate error from gauge radar differential values. Additionally, the techniques described herein may be used to create recommendations and alerts for farmers, insurance companies, and hydrologists, thereby allowing for a more effective response to particular weather conditions.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A digital computing system comprising:
a memory storing one or more instructions;
one or more processors configured to execute the one or more instructions which, when executed by the one or more processors, cause performance of:
receiving over a network at the digital computing system, first electronic digital data comprising a first plurality of values representing precipitation gauge measurements at a plurality of gauge locations;
obtaining second electronic digital data comprising a second plurality of values representing radar based precipitation estimates at the plurality of gauge locations;
for each radar based precipitation estimate value at the plurality of gauge locations:
identifying one or more corresponding precipitation gauge measurement values of the first plurality of values representing precipitation gauge measurements;
computing a gauge radar differential value for the radar based precipitation estimate based, at least in part, on one or more corresponding precipitation gauge measurement values of the first plurality of values representing precipitation gauge measurements and the radar based precipitation estimate value;
storing the gauge radar differential value with location data identifying a corresponding location of the plurality of gauge locations;
obtaining a particular radar based precipitation estimate at a non-gauge location;
for each gauge location of the plurality of gauge locations, computing a correlation distance value comprising a distance of computed in at least three dimensions, two of the at least three dimensions comprising physical distances and one of the at least three dimensions comprising a difference in precipitation intensity between the gauge location and the non-gauge location or a difference in distance from a source of a corresponding radar based precipitation estimate between the gauge location and the non-gauge location;
determining that one or more particular gauge radar differential values at one or more particular gauge locations of the plurality of gauge locations correspond to the particular radar based precipitation estimate at the non-gauge location, the determining comprising identifying a subset of the plurality of gauge locations that have lower correlation distance values than remaining gauge locations of the plurality of gauge locations and selecting the one or more particular gauge locations from the subset of the plurality of gauge locations;
computing a particular radar based precipitation estimate error at the non-gauge location based, at least in part, on the one or more particular gauge radar differential values at the one or more particular gauge locations and one or more distances between the non-gauge location and the one or more particular gauge locations;
causing displaying, on a client computing device, the particular radar based precipitation estimate and the particular radar based precipitation estimate error at the non-gauge location.

2. The computing system of claim 1, wherein the one or more instructions when, executed by the one or more processors, further cause performance of:
storing a first threshold value;
wherein determining that the one or more particular gauge radar differential values at the one or more particular gauge locations of the plurality of gauge locations correspond to the particular radar based precipitation estimate at the non-gauge location comprises:
identifying a subset of the plurality of gauge locations that are within a distance from the non-gauge location that is less than or equal to the first threshold value;
selecting the one or more particular gauge locations from the subset of the plurality of gauge locations.

3. The computing system of claim 1, wherein the one or more instructions when, executed by the one or more processors, further cause performance of:
for each gauge location of the plurality of gauge locations:
identifying a precipitation gauge measurement value corresponding to the gauge location;
computing a plurality of radar based precipitation estimate errors at the gauge location using a plurality of different parameter sets and based, at least in part, on one or more gauge radar differential values at one or more other gauge locations of the plurality of gauge locations and one or more distances between the gauge location and the one or more other gauge locations;
identifying one or more parameter sets that minimize a difference between a computed radar based precipitation estimate error and a gauge radar differential value at the gauge location;
selecting a particular parameter set of the plurality of different parameter sets based, at least in part, on the identified one or more parameter sets at one or more parameterized gauge locations;
computing the particular radar based precipitation estimate error at the non-gauge location using the particular parameter set.

4. The computing system of claim 3, wherein the one or more instructions when, executed by the one or more processors, further cause performance of: storing a first threshold value; wherein selecting the particular parameter set of the plurality of different parameter sets comprises selecting from a particular number of the plurality of gauge locations that are within a shortest distances from the non-gauge location wherein the particular number is less than or equal to the first threshold value.

5. The computing system of claim 1, wherein the one or more instructions when, executed by the one or more processors, further cause performance of: storing a first threshold value; wherein determining that the one or more particular gauge radar differential values at the one or more particular gauge locations of the plurality of gauge locations correspond to the particular radar based precipitation estimate at the non-gauge location comprises: identifying a particular number of the plurality of gauge locations that are within a shortest distances from the non-gauge location wherein the particular number is less than or equal to the first threshold value; selecting the one or more particular gauge locations from the particular number of the plurality of gauge locations.

6. The computing system of claim 5, wherein the one or more instructions when, executed by the one or more processors, further cause performance of:
storing a second threshold value;
wherein determining that the one or more particular gauge radar differential values at the one or more particular gauge locations of the plurality of gauge locations correspond to the particular radar based precipitation estimate at the non-gauge location comprises:
identifying a subset of the particular number of the plurality of gauge locations that are within a distance from the non-gauge location that is less than or equal to the second threshold value;
selecting the one or more particular gauge locations from the subset of the particular number of the plurality of gauge locations.

7. The computing system of claim 1, wherein the one or more instructions when, executed by the one or more processors, further cause performance of:
computing a first distance value representing a distance between the non-gauge location and a closest gauge location of the plurality of gauge locations;
based, at least in part on the first distance value, computing a second distance value;
wherein determining that the one or more particular gauge radar differential values at the one or more particular gauge locations of the plurality of gauge locations correspond to the particular radar based precipitation estimate at the non-gauge location comprises:
identifying a subset of the plurality of gauge locations that are within a distance from the non-gauge location that is less than or equal to the second distance value;
selecting the one or more particular gauge locations from the subset of the plurality of gauge locations.

8. The computing system of claim 1, wherein the one or more instructions when, executed by the one or more processors, further cause performance of:
storing a first threshold value;
computing a first distance value representing a distance between the non-gauge location and a closest gauge location of the plurality of gauge locations;
determining that the first distance value is greater than the first threshold value;
wherein determining that the one or more particular gauge radar differential values at the one or more particular gauge locations of the plurality of gauge locations correspond to the particular radar based precipitation estimate at the non-gauge location comprises selecting the closest gauge location as the one or more particular gauge locations.

9. The computing system of claim 1, wherein the one or more instructions when, executed by the one or more processors, further cause performance of: for each gauge location of the plurality of gauge locations: identifying a precipitation gauge measurement value corresponding to the gauge location; computing a plurality of radar based precipitation estimate errors at the gauge location using a plurality of different sets of correlation distance value weights and based, at least in part, on one or more gauge radar differential values at one or more other gauge locations of the plurality of gauge locations and one or more distances between the gauge location and the one or more other gauge locations; identifying one or more sets of correlation distance value weights that minimize a difference between a computed radar based precipitation estimate error and a gauge radar differential value at the gauge location; selecting a set of correlation distance value weights based, at least in part, on the identified one or more sets of correlation distance value weights at one or more of the plurality of gauge locations; computing the particular radar based precipitation estimate error at the non-gauge location using the selected set of correlation distance value weights.

10. A method comprising:
receiving over a network at a digital computing system, first electronic digital data comprising a first plurality of values representing precipitation gauge measurements at a plurality of gauge locations;
obtaining second electronic digital data comprising a second plurality of values representing radar based precipitation estimates at the plurality of gauge locations;
for each radar based precipitation estimate value at the plurality of gauge locations:
identifying one or more corresponding precipitation gauge measurement values of the first plurality of values representing precipitation gauge measurements;
computing a gauge radar differential value for the radar based precipitation estimate based, at least in part, on one or more corresponding precipitation gauge measurement values of the first plurality of values representing precipitation gauge measurements and the radar based precipitation estimate value;
storing the gauge radar differential value with location data identifying a corresponding location of the plurality of gauge locations;
obtaining a particular radar based precipitation estimate at a non-gauge location;
for each gauge location of the plurality of gauge locations, computing a correlation distance value comprising a distance of computed in at least three dimensions, two of the at least three dimensions comprising physical distances and one of the at least three dimensions comprising a difference in precipitation intensity between the gauge location and the non-gauge location or a difference in distance from a source of a corresponding radar based precipitation estimate between the gauge location and the non-gauge location;
determining that one or more particular gauge radar differential values at one or more particular gauge locations of the plurality of gauge locations correspond to the particular radar based precipitation estimate at the non-gauge location, the determining comprising identifying a subset of the plurality of gauge locations that have lower correlation distance values than remaining gauge locations of the plurality of gauge locations and selecting the one or more particular gauge locations from the subset of the plurality of gauge locations;
computing a particular radar based precipitation estimate error at the non-gauge location based, at least in part, on the one or more particular gauge radar differential values at the one or more particular gauge locations and one or more distances between the non-gauge location and the one or more particular gauge locations;
causing displaying, on a client computing device, the particular radar based precipitation estimate and the particular radar based precipitation estimate error at the non-gauge location.

11. The method of claim 10, further comprising:
storing a first threshold value;
wherein determining that the one or more particular gauge radar differential values at the one or more particular gauge locations of the plurality of gauge locations correspond to the particular radar based precipitation estimate at the non-gauge location comprises:
identifying a subset of the plurality of gauge locations that are within a distance from the non-gauge location that is less than or equal to the first threshold value;
selecting the one or more particular gauge locations from the subset of the plurality of gauge locations.

12. The method of claim 10, further comprising:
for each gauge location of the plurality of gauge locations:
identifying a precipitation gauge measurement value corresponding to the gauge location;
computing a plurality of radar based precipitation estimate errors at the gauge location using a plurality of different parameter sets and based, at least in part, on one or more gauge radar differential values at one or more other gauge locations of the plurality of gauge locations and one or more distances between the gauge location and the one or more other gauge locations;
identifying one or more parameter sets that minimize a difference between a computed radar based precipitation estimate error and a gauge radar differential value at the gauge location;
selecting a particular parameter set of the plurality of different parameter sets based, at least in part, on the identified one or more parameter sets at one or more parameterized gauge locations;
computing the particular radar based precipitation estimate error at the non-gauge location using the particular parameter set.

13. The method of claim 12, further comprising: storing a first threshold value; wherein selecting the particular parameter set of the plurality of different parameter sets comprises selecting from a particular number of the plurality of gauge locations that are within a shortest distances from the non-gauge location wherein the particular number is less than or equal to the first threshold value.

14. The method of claim 10, further comprising: storing a first threshold value; wherein determining that the one or more particular gauge radar differential values at the one or more particular gauge locations of the plurality of gauge locations correspond to the particular radar based precipitation estimate at the non-gauge location comprises: identifying a particular number of the plurality of gauge locations that are within a shortest distances from the non-gauge location wherein the particular number is less than or equal to the first threshold value; selecting the one or more particular gauge locations from the particular number of the plurality of gauge locations.

15. The method of claim 14, further comprising:
storing a second threshold value;
wherein determining that the one or more particular gauge radar differential values at the one or more particular gauge locations of the plurality of gauge locations correspond to the particular radar based precipitation estimate at the non-gauge location comprises:
identifying a subset of the particular number of the plurality of gauge locations that are within a distance from the non-gauge location that is less than or equal to the second threshold value;
selecting the one or more particular gauge locations from the subset of the particular number of the plurality of gauge locations.

16. The method of claim 10, further comprising:
computing a first distance value representing a distance between the non-gauge location and a closest gauge location of the plurality of gauge locations;
based, at least in part on the first distance value, computing a second distance value;
wherein determining that the one or more particular gauge radar differential values at the one or more particular gauge locations of the plurality of gauge locations correspond to the particular radar based precipitation estimate at the non-gauge location comprises:
identifying a subset of the plurality of gauge locations that are within a distance from the non-gauge location that is less than or equal to the second distance value;
selecting the one or more particular gauge locations from the subset of the plurality of gauge locations.

17. The method of claim 10, further comprising:
storing a first threshold value;
computing a first distance value representing a distance between the non-gauge location and a closest gauge location of the plurality of gauge locations;
determining that the first distance value is greater than the first threshold value;
wherein determining that the one or more particular gauge radar differential values at the one or more particular gauge locations of the plurality of gauge locations correspond to the particular radar based precipitation estimate at the non-gauge location comprises selecting the closest gauge location as the one or more particular gauge locations.

18. The method of claim 10, further comprising: for each gauge location of the plurality of gauge locations: identifying a precipitation gauge measurement value corresponding to the gauge location; computing a plurality of radar based precipitation estimate errors at the gauge location using a plurality of different sets of correlation distance value weights and based, at least in part, on one or more gauge radar differential values at one or more other gauge locations of the plurality of gauge locations and one or more distances between the gauge location and the one or more other gauge locations; identifying one or more sets of correlation distance value weights that minimize a difference between a computed radar based precipitation estimate error and a gauge radar differential value at the gauge location; selecting a set of correlation distance value weights based, at least in part, on the identified one or more sets of correlation distance value weights at one or more of the plurality of gauge locations; computing the particular radar based precipitation estimate error at the non-gauge location using the selected set of correlation distance value weights.

* * * * *